United States Patent
Shirotori et al.

[11] Patent Number: 5,845,309
[45] Date of Patent: Dec. 1, 1998

[54] CACHE MEMORY SYSTEM WITH REDUCED TAG MEMORY POWER CONSUMPTION

[75] Inventors: Tsukasa Shirotori; Atsushi Kawasumi, both of Yokohama, Japan

[73] Assignee: Kabushiki Kaisha Toshiba, Kawasaki, Japan

[21] Appl. No.: 618,777

[22] Filed: Mar. 20, 1996

[30] Foreign Application Priority Data

Mar. 27, 1995 [JP] Japan .................................... 7-067968

[51] Int. Cl.⁶ .............................. G06F 12/00; G06F 1/32
[52] U.S. Cl. .................... 711/3; 364/DIG. 1; 364/243.4; 365/227; 365/189.07; 365/230.03; 395/750.03; 395/750.05; 711/118; 711/136; 711/160
[58] Field of Search ................................ 365/49, 189.07, 365/227, 230.03; 395/403, 445, 750.03, 750.05; 364/DIG. 1, DIG. 2, 243.4, 243.41; 711/118, 136, 160

[56] References Cited

U.S. PATENT DOCUMENTS

| | | | |
|---|---|---|---|
| 4,991,081 | 2/1991 | Bosshart | 395/403 |
| 5,412,809 | 5/1995 | Tam et al. | 395/750 |
| 5,428,565 | 6/1995 | Shaw | 365/49 |
| 5,504,908 | 4/1996 | Ikeda | 395/750 |
| 5,522,056 | 5/1996 | Watanabe et al. | 395/455 |
| 5,541,489 | 7/1996 | Dunstan | 320/2 |
| 5,553,262 | 9/1996 | Ishida et al. | 395/450 |

OTHER PUBLICATIONS

Patterson et al, Computer Architecture A Quantitative Approach, 1990, pp. 408–417.
Hamacher et al., Computer Organization, 1990, pp. 330–341.

*Primary Examiner*—Tod R. Swann
*Assistant Examiner*—Tuan V. Thai
*Attorney, Agent, or Firm*—Foley & Lardner

[57] ABSTRACT

A cache memory system has an address register for storing a tag address and an index address of data to be accessed, a plurality of data memories for storing data corresponding to said index address, a plurality of tag memories corresponding to said data memories for storing tag addresses relating to said data stored in said data memories, and tag comparators corresponding to said tag memories for comparing a tag address stored in said tag memories with the tag address stored in the address register and for determining whether a cache hit has occurred or a cache miss has occurred. A reference frequency information register stores information indicating a tag memory which has resulted in a cache hit. An access control circuit selects one of the tag memories and one of the comparators corresponding to the selected tag memory based on the information from the reference frequency information register. Only the selected tag memory and the selected tag comparator are operated in order to control a comparison operation of tag addresses and to reduce power consumption.

5 Claims, 9 Drawing Sheets

CACHE MEMORY SYSTEM WITH REDUCED TAG MEMORY POWER CONSUMPTION

BACKGROUND OF THE INVENTION

1. Field of the Invention

The present invention relates to a cache memory system of a low power consumption type executed based on a set associative control method.

2. Description of the Prior Art

There is a set associative control method as one of mapping methods for mapping blocks to be stored into a cache memory which is generally most used in cache memory systems at the present time.

In a conventional cache memory system in which blocks to be stored are mapped based on an n-way set associative control method, the target block is referred to by using an index address which is a part of a reference address when a tag address reference operation for checking whether or not a target block to be read out/overwritten is stored in the cache memory.

In the conventional n-way set associative control method, because there are n-way cache blocks (or cache sets) which are referred to by using a same index address, a tag address of the number of the n-ways are read out from a tag memory at the same time and compared with a tag address stored in the reference address in order to check whether or not there is data addressed by the tag address in the reference address of the cache memory (which is called as a cache hit operation when hits occur or a cache miss operation when misses occur).

FIG. 1 is a block diagram showing a configuration of a cache memory system based on the conventional control method described above. The operation of this conventional cache memory system is controlled based on a 2-way (n=2) set associative control method.

Specifically, the conventional cache memory system as shown in FIG. 1 has an address register 101 for storing a tag address and an index address, two tag memories 103-0 and 103-1, two data memories 105-0 and 105-1 which are incorporated corresponding to these tag memories 103-0 and 103-1 respectively, a Least Recently Used (LRU) bit register 107 for storing LRU bits which shows information relating to which tag memory in the tag memories 103-0 and 103-1 has been used recently, for example, tag comparators 109-0 and 109-1 (hereinafter we call them as only comparators 109-0 and 109-1) which are provided for tag memories 103-0 and 103-1 in order to compare the tag address in the address register 101 with the tag address stored in the tag memory and for deciding whether the cache hit (these tag addresses agree with each other) has occurred or the cache miss has happened, a hit control circuit 111 for receiving the information stored in the LRU bit register 107 and information which indicates the occurrence of the cache miss (in this case, these tag addresses are not equal to each other) or the cache hit and for generating a control signal which will be used in a data memory access operation for writing/reading it to/from the data memories 105-0 and 105-1, and a way selector 113 for selecting one of data from the data memories 105-0 and 105-1 and for providing the selected one to outside of the cache memory system.

In the conventional cache memory system based on the n-way set associative control method having the configuration described above, in the tag address reference operation for checking which tag memory stores the tag address which is equal to the tag address stored in the address register 101, firstly tag addresses stored in all of the tag memories 103-0 and 103-1 are read out at the same time and then they are compared to the tag address in the address register 101 for checking which one is equal to the tag address in the address register 101. If the tag address stored in one of tag memories 103-0 and 103-1 is equal to the tag address stored in the address register 101, data stored in the data memory corresponding to the selected tag memory is read out.

FIG. 2 is a timing chart showing the cache timing of the conventional cache memory system using the conventional control method as shown in FIG. 1.

In the conventional control method for accessing the conventional cache memory system, there is a drawback that power consumption of the data reference operation becomes greater because all of the tag memories 103-0 and 103-1 and all of the comparators 109-0 and 109-1 are executed at the same time and one of the tag memories 103-0 and 103-1 enters invariably into the cache miss operation in the tag memory reference operation and the tag memory read out operation. In other words, the power consumption for the tag memory readout operation and the tag memory comparing operation for the tag memory of one way is wasted during the tag memory reference operation for one-way. This is a problem.

SUMMARY OF THE INVENTION

The present invention is invented in order to overcome the drawback included in the conventional cache memory system described above.

An object of the present invention is to provide a cache memory system of a low power consumption type.

In order to achieve the objects described above, in accordance with one preferred aspect of the present invention, there is provided a cache memory system comprising: an address register for storing a tag address and an index address of data to be accessed; data memories of n-ways ("n" is an integer which is not less than two) for storing data corresponding to said index address; tag memories of n-ways incorporated corresponding to said data memories for storing tag addresses relating to said data stored in said data memories; N-tag comparators incorporated corresponding to said tag memories of the n-ways, for comparing said tag address stored in said tag memories of the n-ways with said tag address stored in said address register, and for determining a cache hit where these tag addresses are the same or a cache miss where these tag addresses are different; a reference frequency information register for storing information indicating the way of said tag memory which has fallen into said cache hit; an access control circuit for selecting one of said tag memories of said n-ways and one of said comparators corresponding to said selected tag memory based on said information from said reference frequency information register, for operating only said selected tag memory and said selected tag comparator, and for controlling a comparison operation between said tag address stored in said address register and said tag address in said selected tag memory executed by said selected tag comparator.

In the cache memory system described above, N is two in said n-way tag memories and said n-way data memories, and said reference frequency register is a Last Recently Used (LRU) bit register for storing said information relating to the way of said tag memory corresponding to said data memory to which data will be overwritten in a following data update operation.

In addition, in the cache memory system above, N is not less than three in said n-way tag memories and said n-way data memories, and said reference frequency register is a Most Recently Used (MRU) bit register for storing said information relating to the way of said tag memory corresponding to said data memory which is referred to recently in a reference operation for said tag address.

Moreover, the cache memory system above further comprises a reference mode control signal generation means for generating a reference mode control signal to control the operation of said access control circuit, and said access control circuit receives said reference mode control signal and for switching a first reference operation mode where one of said tag memories and one of said tag comparators are executed based on said information from said MRU bit register and a second reference operation mode where all of said tag memories and all of said tag comparators are executed at the same time.

Further, the cache memory system above further comprises a reference mode control signal generation means for generating a reference mode control signal to control the operation of said access control circuit, and said access control circuit receives said reference mode control signal and for switching a first reference operation mode where one of said tag memories and one of said tag comparators are executed based on said information from said LRU bit register and a second reference operation mode where all of said tag memories and all of said tag comparators are executed at the same time.

Furthermore, in the cache memory system above, when said access control circuit receives information to indicate an occurrence of a cache miss in a first reference operation from said tag comparator used in said first reference operation, said access control circuit generates a control signal and transmits said control signal to all of said tag memories and all of said tag comparators other than said tag memory and said tag comparator which has fallen into said cache miss in said first reference operation, and said all of said tag memories and said all of said tag comparators other than said tag memory and said tag comparator used in the first reference operation are executed at the same time in a following reference operation.

The cache memory system above, further comprises a hit control circuit for receiving information relating to the occurrence of the cache miss operation from said tag comparator selected by said access control circuit, for generating a control signal indicating to select other tag memories and other tag comparators which are not selected by said access control circuit, and for transmitting the control signal to said access control circuit, wherein said access control circuit receives the control signal transmitted from said hit control circuit and indicates to perform said other tag memories and said other tag comparators at the same time to said other tag memories and said other tag comparators based on the control signal.

These and other objects, features, aspects and advantages of the present invention will become more apparent from the following detailed description of the present invention when taken in conjunction with the accompanying drawings.

DESCRIPTION OF THE PREFERRED EMBODIMENTS

Other features of this invention will become apparent in the course of the following description of exemplary embodiments which are given for illustration of the invention and are not intended to be limiting thereof.

Preferred embodiments of the present invention will now be explained with reference to the drawings of FIG. 3 to FIG. 9.

Embodiment 1

Figure 3:
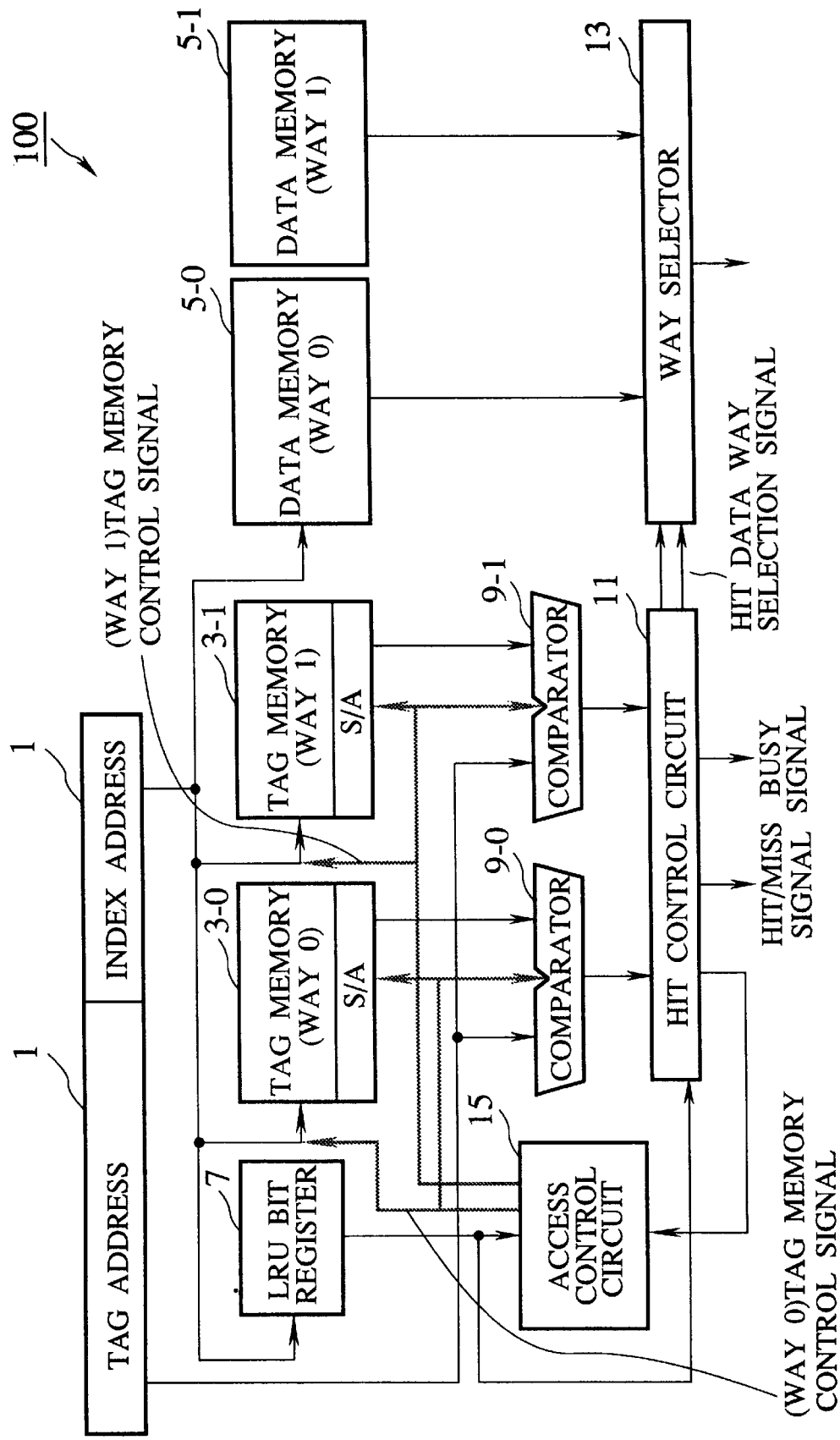
FIG. 3 is a block diagram showing a configuration of a cache memory system based on a set associative control method as the first embodiment according to the present invention.
Figure 4:
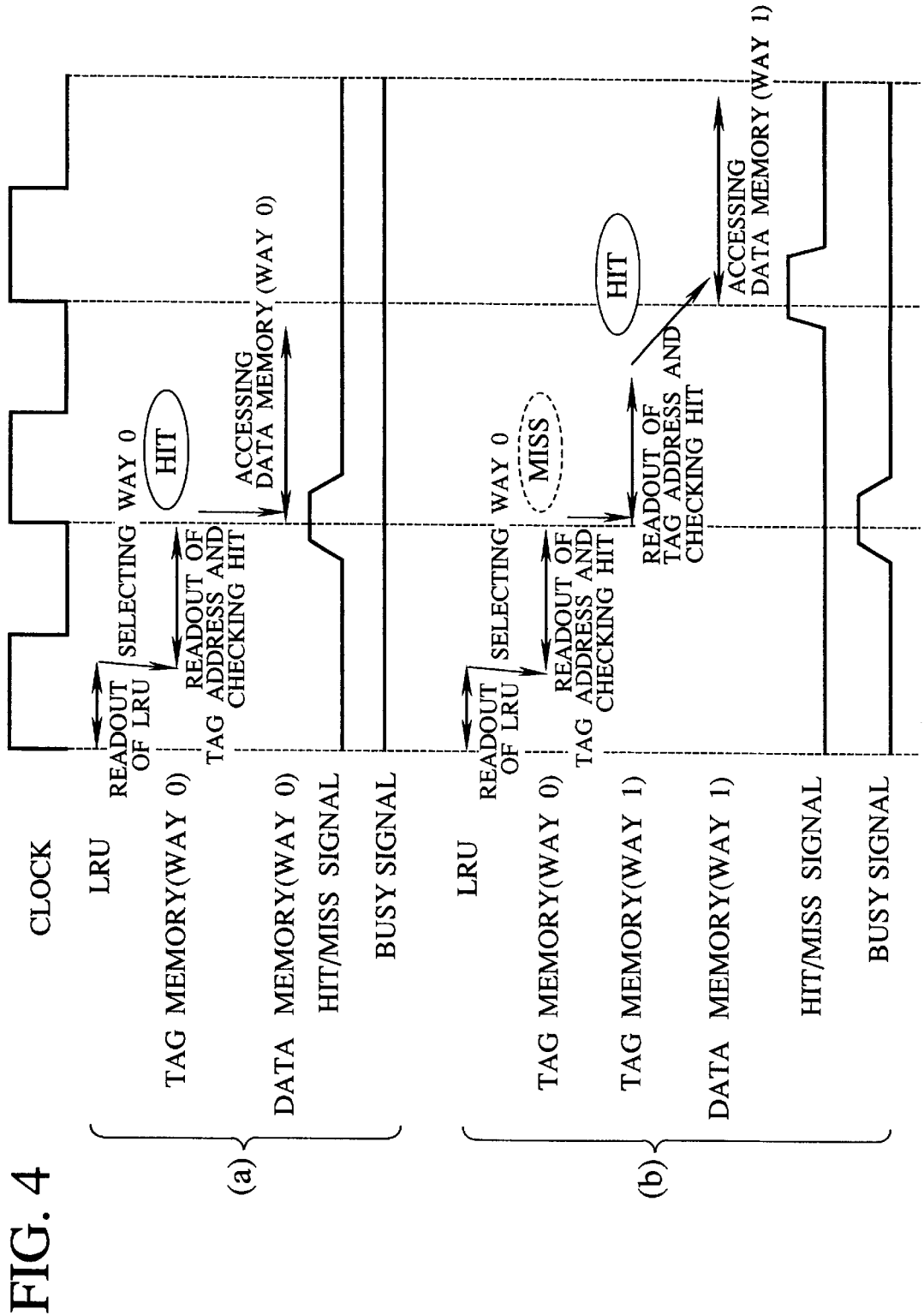
FIG. 4 is a timing chart showing the cache timing of the cache memory system based on the set associative control method as the first embodiment of the present invention as shown in FIG. 3.

FIG. 3 is a block diagram showing a configuration of a cache memory system 100 based on a set associative control method as the first embodiment according to the present invention. In addition, FIG. 4 is a timing chart showing the cache timing of the cache memory system 100 based on the set associative control method as the first embodiment of the present invention as shown in FIG. 3.

The cache memory system 100 as the embodiment 1 of the present invention has an address register 1 for storing a tag address and an index address, two tag memories 3-0 and 3-1, two data memories 5-0 and 5-1 which are incorporated corresponding to these tag memories 3-0 and 3-1 respectively, a Least Recently Used (LRU) bit register 7 for storing LRU bits which show which way number in the tag memories 3-0 and 3-1 has been used recently, for example, tag comparators 9-0 and 9-1 (hereinafter we often call them as only comparators 9-0 and 9-1) which are provided for tag memories 3-0 and 3-1 in order to compare the tag address in the address register 1 with the tag address stored in the tag memory and for deciding whether the cache hit (these tag addresses are equal to each other) has occurred or the cache miss (these tag addresses are not equal to each other) has happened, a hit control circuit 11 for receiving the information stored in the LRU bit register 7 and information which indicates the occurrence of the cache miss or the cache hit from the comparators 9-0 and 9-1 and for generating control signals such as a hit/miss signal, a busy signal to be transmitted to outside devices such as a Central Processing Unit (CPU, not shown) and a control signal to be transmitted to an access control circuit 15 (whose function and operation will be described later) which will be used in a data memory access operation for overwriting/reading it to/from the data memories 5-0 and 5-1, a way selector 13 for selecting one of data from the data memories 5-0 and 5-1 based on the control signal from the hit control circuit 11 and for providing the selected one to outside of the cache memory system, and an access control circuit 15 for controlling the operations of the tag memories 3-0 and 3-1, and the tag comparators 9-0 and 9-1.

Figure 1:
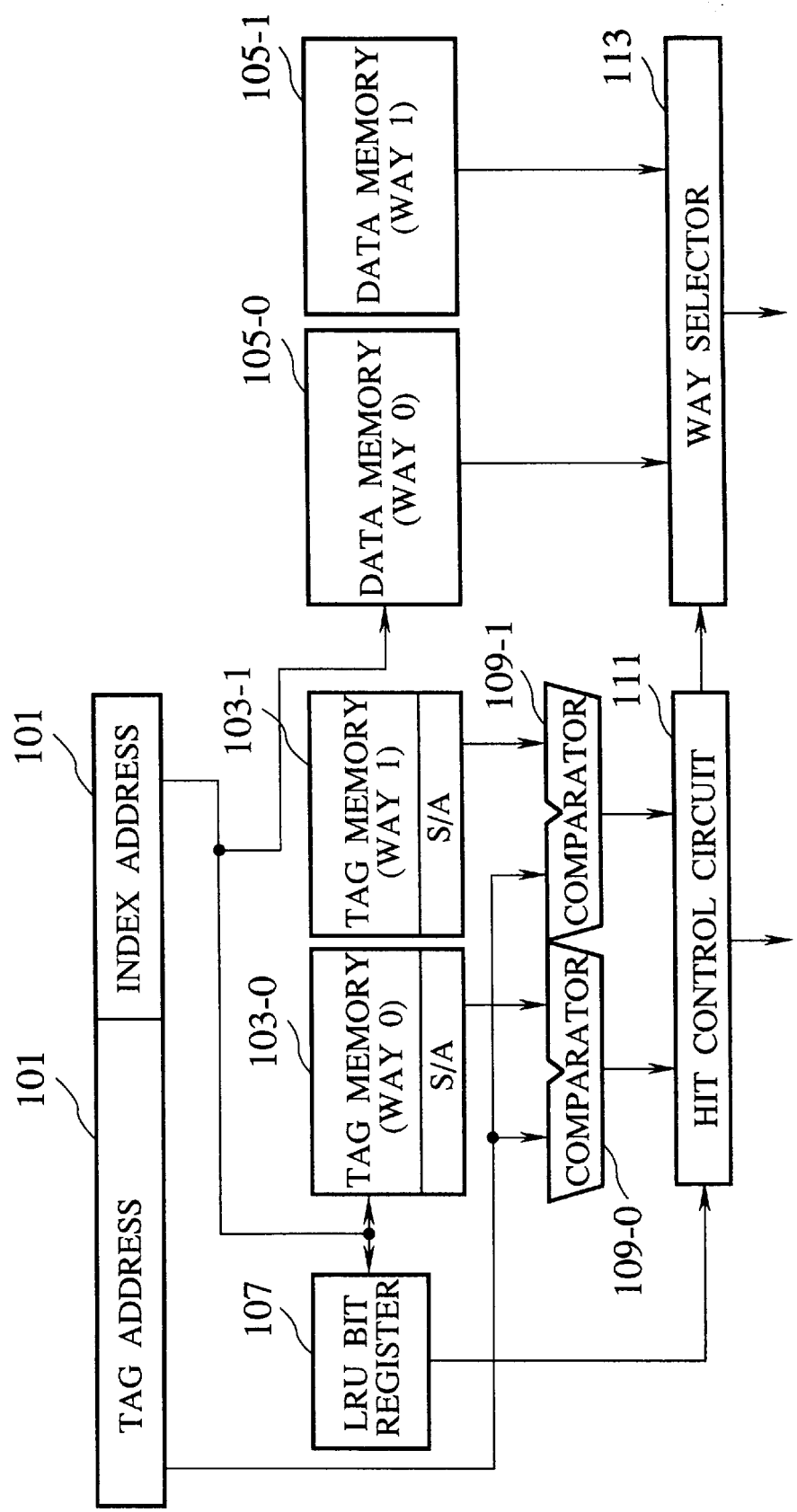
FIG. 1 is a block diagram showing a configuration of a conventional cache memory system based on a conventional set associative control method.
Figure 2:
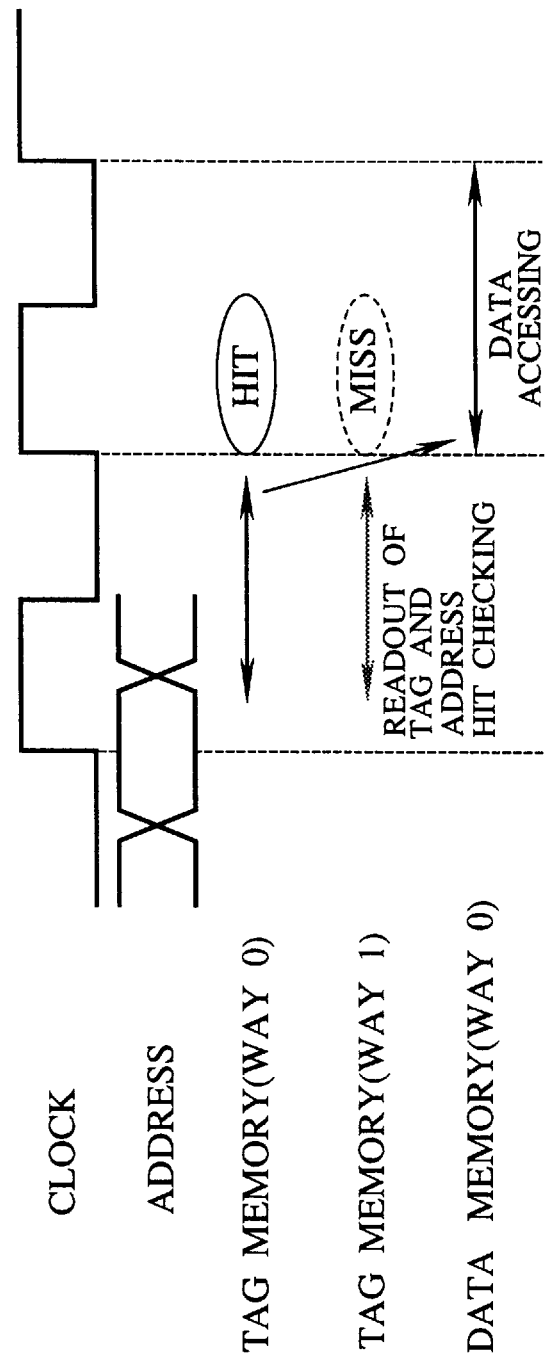
FIG. 2 is a timing chart showing the cache timing of the conventional cache memory system based on the conventional set associative control method as shown in FIG. 1.

In the operation of the cache memory system 100 according to the embodiment 1 of the present invention, the first access operation to the tag memories 3-0 and 3-1 is executed for one of the tag memories 3-0 and 3-1 based on the information stored in the LRU bit register 7. This first access operation is different from that of the conventional cache memory system as shown in FIGS. 1 and 2. This is a feature of the present invention.

In order to perform the operation described above, the cache memory system of the embodiment 1 has the access control circuit 15 which is placed between and connected to the tag memories 3-0 and 3-1, the tag comparators 9-0 and 9-1, and the LRU bit register 7. The access control circuit 15 receives access frequency information, for example a way number of a tag memory other than a tag memory which has been accessed Just before or a way number of a tag memory which has been accessed just before from the LRU bit register 7. In the reference operation, sense amplifiers (S/A) for readout of data stored in tag memories 3-0 and 3-1 and the tag comparators 9-0 and 9-1 are executed.

The reference operation of the cache memory system 100 having the configuration shown in FIG. 3 as the embodiment 1 of the present invention based on the 2-way set associative control method will be explained referring to FIG. 4.

Firstly, the cache memory system receives a reference address to be referred to and divides it to an index address component and a tag address component and then stores them into the address register 1. The index address is provided to a set of the way 0 and way 1, namely both tag memories 3-0 and 3-1, the set of the way 0 and the way 1 of both data memories 5-0 and 5-1. Next, the access control circuit 15 receives the information stored in the LRU bit register 7.

In the cache memory system 100 of the embodiment 1, the information, namely bits stored in the LRU bit register 7 is the information showing a reference frequency relating to the tag memories 3-0 and 3-1. This reference frequency information indicates the way number of the tag memory which has not been referred to just before in the reference operation. In other words, the reference frequency information stored in the LRU bit register 7 indicates the way number of the tag memory where the cache miss has occurred just before. By using the reference frequency information from the LRU bit register 7, the cache memory system 100 will overwrite the contents stored in the tag memory and the data memory corresponding to this way number.

In this embodiment 1 of the present invention, the reference frequency information stored in the LRU bit register 7 can be used for the control operation of the access control circuit 15. In general, there is a high probability that the blocks that have been referred to recently will be referred to again soon. When a block is to be overwritten, it is sensible to overwrite the one that has gone the longest time without being referred to. That is, because the reference frequency information stored in the LRU bit register 7 indicates the way number of the tag memory having a lower referred frequency time, the access control circuit 15 can know the way number of the tag memory to be accessed which is the tag memory other than the tag memory having this way number indicated by the information stored in the LRU bit register 7. Thus, the access control circuit 11 reads out the information in the LRU bit register 7 and then determines the way number of the tag memory to be accessed based on this information and accesses the tag memory having the selected way number.

As shown in the upper side (see (a)) of FIG. 4, when the operation of the tag comparator which is corresponding to the tag memory of the way 0 which is selected in the first reference operation under the control of the access control circuit 15 has fallen into the cache hit, as shown in (a) of FIG. 4, the power consumption (which is mainly used for the readout operation of data stored in the tag memory and the operation of Sense Amplifiers (S/As)) of the cache memory system 100 of the embodiment 1 is smaller (approximately a half) than that of the conventional cache memory system shown in FIG. 1 because only one tag memory 3-0 of the way 0 in the tag memories 3-0 and 3-1 and the tag comparator 9-0 corresponding to this tag memory 3-0 are accessed under the control of the access control circuit 15. That is, half of the power consumption in the conventional cache memory system is used for the cache memory system of the embodiment 1.

Although the first reference operation is performed based on the information stored in the LRU bit register 7, the cache miss has happened, as shown in the lower side (see (b)) in FIG. 4. This first reference operation has been selected firstly by the access control circuit 15, and the hit control circuit 11 transmits a control signal indicating the occurrence of the cache miss to the access control circuit 15. Then, the access control circuit 15 transmits the control signal to the other tag memory 3-1 and the tag comparator 9-1 corresponding to this tag memory 3-1 in order to access them in the following reference operation. In this case, when the cache hit has occurred in the second reference operation, although it takes much operation time than the conventional cache memory system shown in FIG. 1, the power consumption of the cache memory system 100 is approximately equal to that of the conventional one.

Thus, the reference operation of the cache memory system 100 of the low power consumption type is firstly executed for one tag memory 3-0 under the control of the access control circuit 15, and then the following reference operation is performed for another tag memory 3-1 if the cache miss has happened in the first reference operation.

By controlling the reference operation in the cache memory system 100 described above, it can be obtained to reduce the power consumption of the cache memory system based on the n-way set associative control method.

When the cache miss has happened in the first reference operation, information relating to this occurrence of the cache miss is not transmitted to a target device (for example, a Central Processing Unit (CPU), not shown) to which the data in the cache memory is transmitted. In this case, because there is a possibility of happening the cache hit in the following reference operation, the cache memory system 100, specifically, the hit control circuit 11 does not inform the occurrence of the cache miss to the target device. In the following reference operation, namely in the second reference operation, when the cache miss has occurred, the hit control circuit 11 in the cache memory system 100 transmits the information relating to the occurrence of the cache miss to the target device. Of course, when the cache hit has happened in the reference operation, the hit control circuit 11 in the cache memory system 100 immediately transmits the information (such as the hit/miss signal shown in FIG. 3) relating to the occurrence of the cache hit. Thus, the hit control circuit 11 in the cache memory system 100 operates as described above in detail.

By using this access control method, the power consumption (it is mainly used for Sense Amplifiers (S/As)) of the tag memories of the cache memory system of the embodiment 1 becomes approximately a half of that of the tag memories of the conventional cache memory system as shown in FIG. 1. This effect of the embodiment 1 of the present invention becomes greater when the number of the ways of the tag memories and the data memories is increased.

Embodiment 2

Before explaining a cache memory system 200 of the preferred embodiment 2 of the present invention, an example of the prior art relating to the embodiment 2 of the present invention will be explained.

Figure 5:
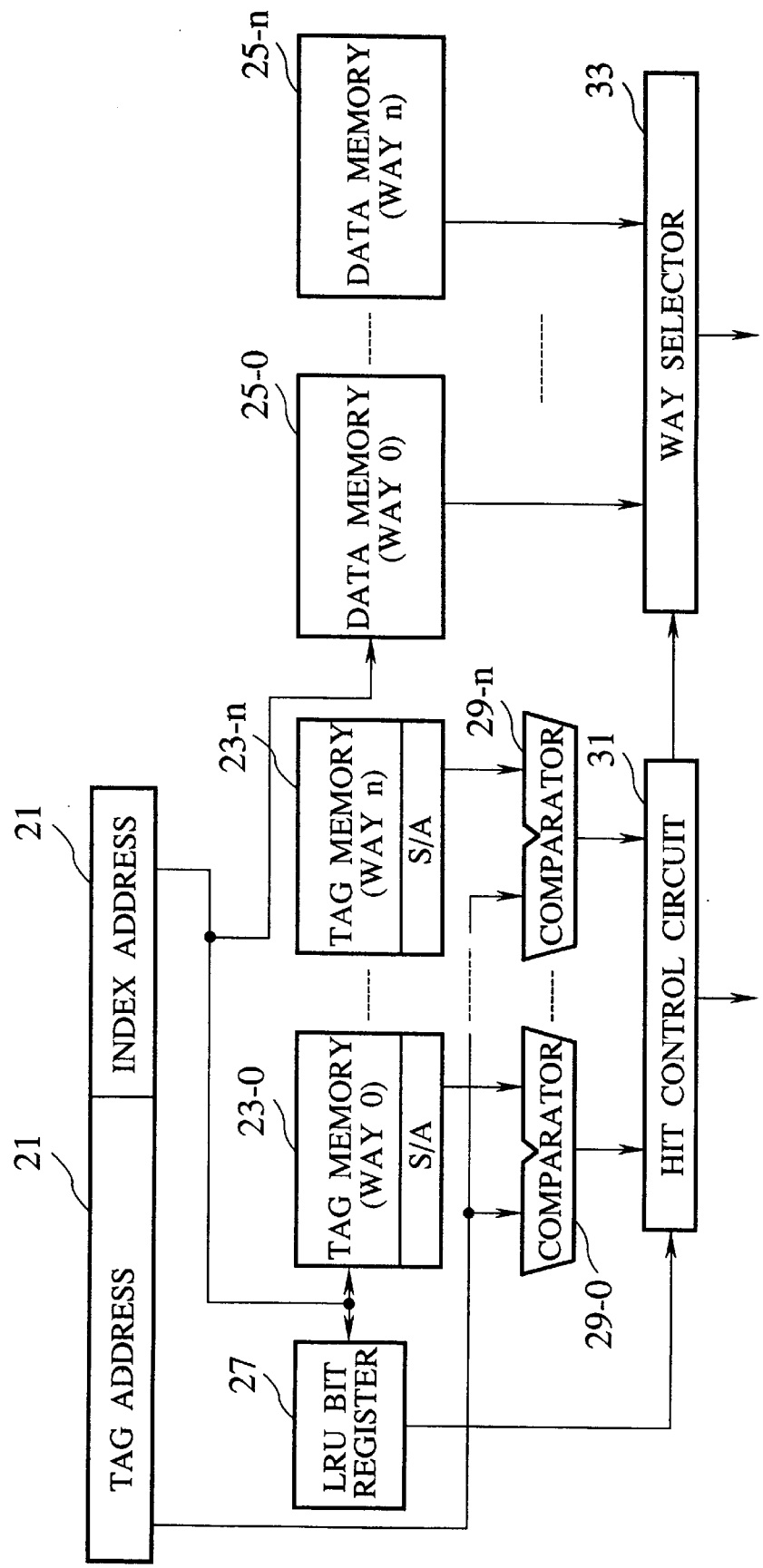
FIG. 5 is a block diagram showing a configuration of a cache memory system based on a conventional n-way set associative control method.

FIG. 5 is a block diagram showing a configuration of a conventional cache memory system based on a conventional n-way set associative control method where n is not less than three, a natural number. This conventional cache memory system based on the n-way set associative method has an address register 21 for storing a tag address and an index address, (n+1) tag memories 23-0 to 23-n of n-ways, (n+1) data memories 25-0 to 25-n of n-ways which are incorporated corresponding to these tag memories 23-0 to 23-n respectively, a Least Recently Used (LRU) bit register 27 for storing LRU bits which show information relating to which tag memory in the tag memories 23-0 to 23-n has been used recently, for example, (n+1) tag comparators 29-0 to 29-n (hereinafter we often call them as only comparators 29-0 to 29-n) which are provided for the (n+1) tag memories 23-0 to 23-n in order to compare the tag address in the address register 21 with the tag address stored in the tag memory and for deciding whether the cache hit (these tag addresses are equal to each other) has occurred or the cache miss (these tag addresses are not equal to each other) has happened, a hit control circuit 31 for receiving the information stored in the LRU bit register 27 and information which indicates the occurrence of the cache miss or the cache hit from the tag comparators 29-0 to 29-n and for generating a control signal which will be used in the data memory access operation for writing/reading it to/from the data memories 25-0 to 25-n, and a way selector 33 for selecting one of data from the data memories 25-0 to 25-n based on the control signal from the hit control circuit 31 and for providing the selected one to outside of the cache memory system.

Figure 6:
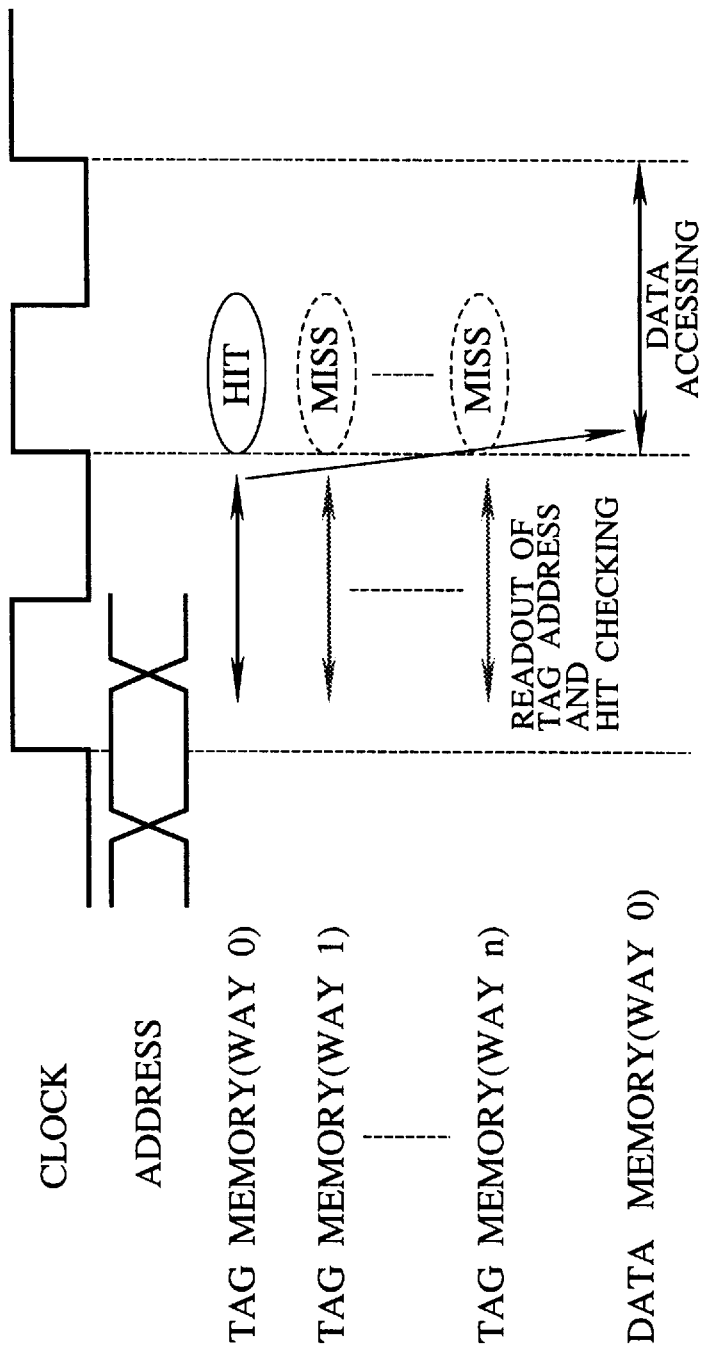
FIG. 6 is a timing chart showing the cache timing of the conventional cache memory system based on the conventional n-way set associative control method as shown in FIG. 5.

FIG. 6 is a timing chart showing the cache timing of the conventional cache memory system based on the conventional n-way set associative control method as shown in FIG. 5.

In the conventional cache memory system based on the conventional n-way set associative control method described above, the reference operation to the tag memories 23-0 to 23-n are always executed for all (n+1) way tag memories at the same time. Of course, although one way tag memory in all (n+1) way tag memories is fallen in the cache hit, the power consumption of the entire of the cache memory system becomes greater because the power consumption of tag memories other than the tag memory that has been in the cache hit is extremely wasteful, namely (n+l) times of the power consumption for a one way tag memory.

As shown in FIG. 6, the tag memory 23-0 of the way 0 enters the cache hit and other tag memories 23-1 to 23-n of the ways 1 to n are fallen into the cache miss. These tag memories 1 to n perform access operations the same as that of the tag memory 23-0 of way 0 and the power consumption for the tag memories 23-1 to 23-n are extremely wasteful. This is a problem.

Because the power consumption of the cache memory system having the conventional configuration and based on the conventional n-way set associative control method described above can be reduced by using the present invention, the present invention can overcome this problem.

Figure 7:
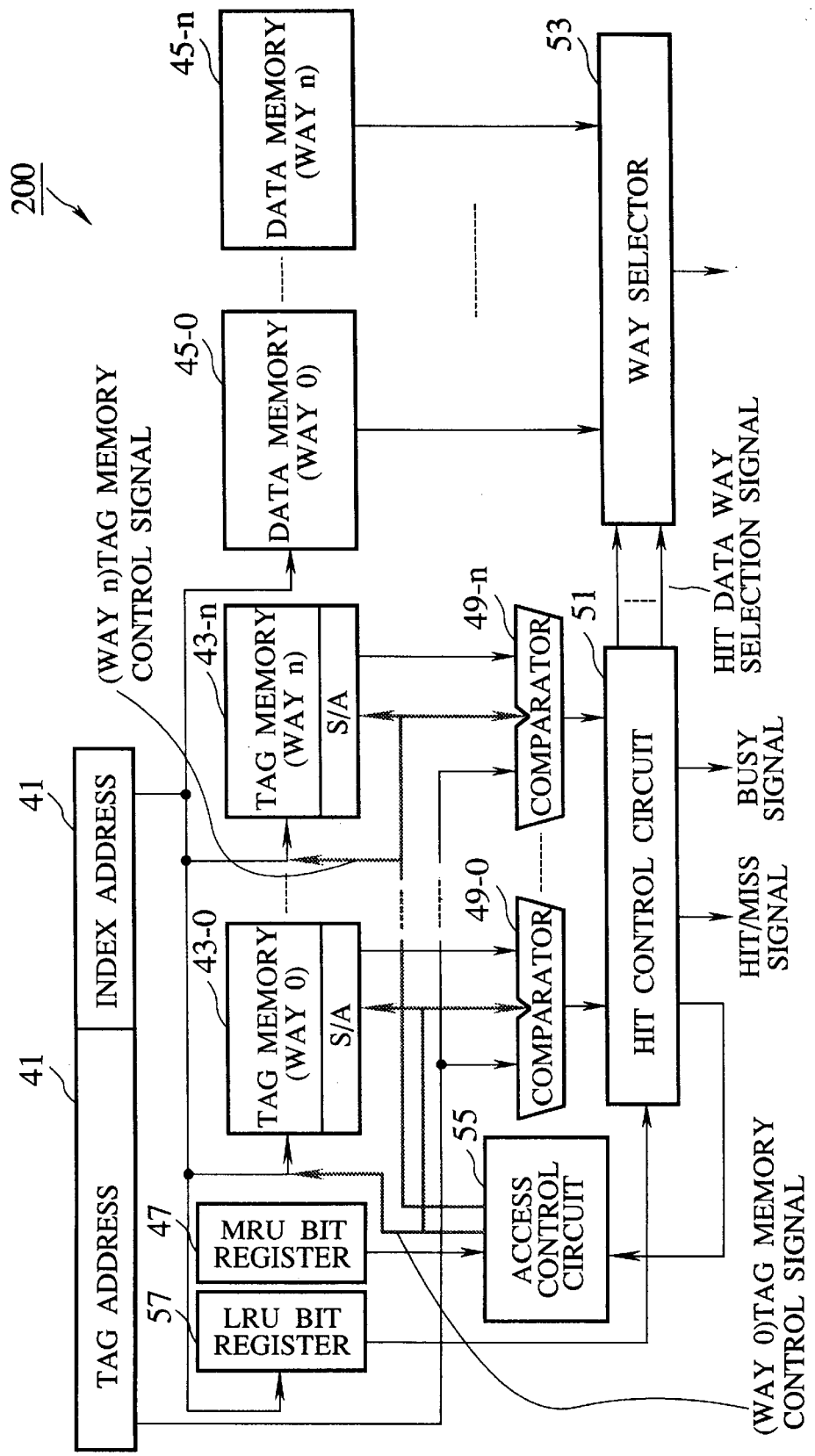
FIG. 7 is a block diagram showing a configuration of a cache memory system based on an n-way set associative control method as the second embodiment according to the present invention.
Figure 8:
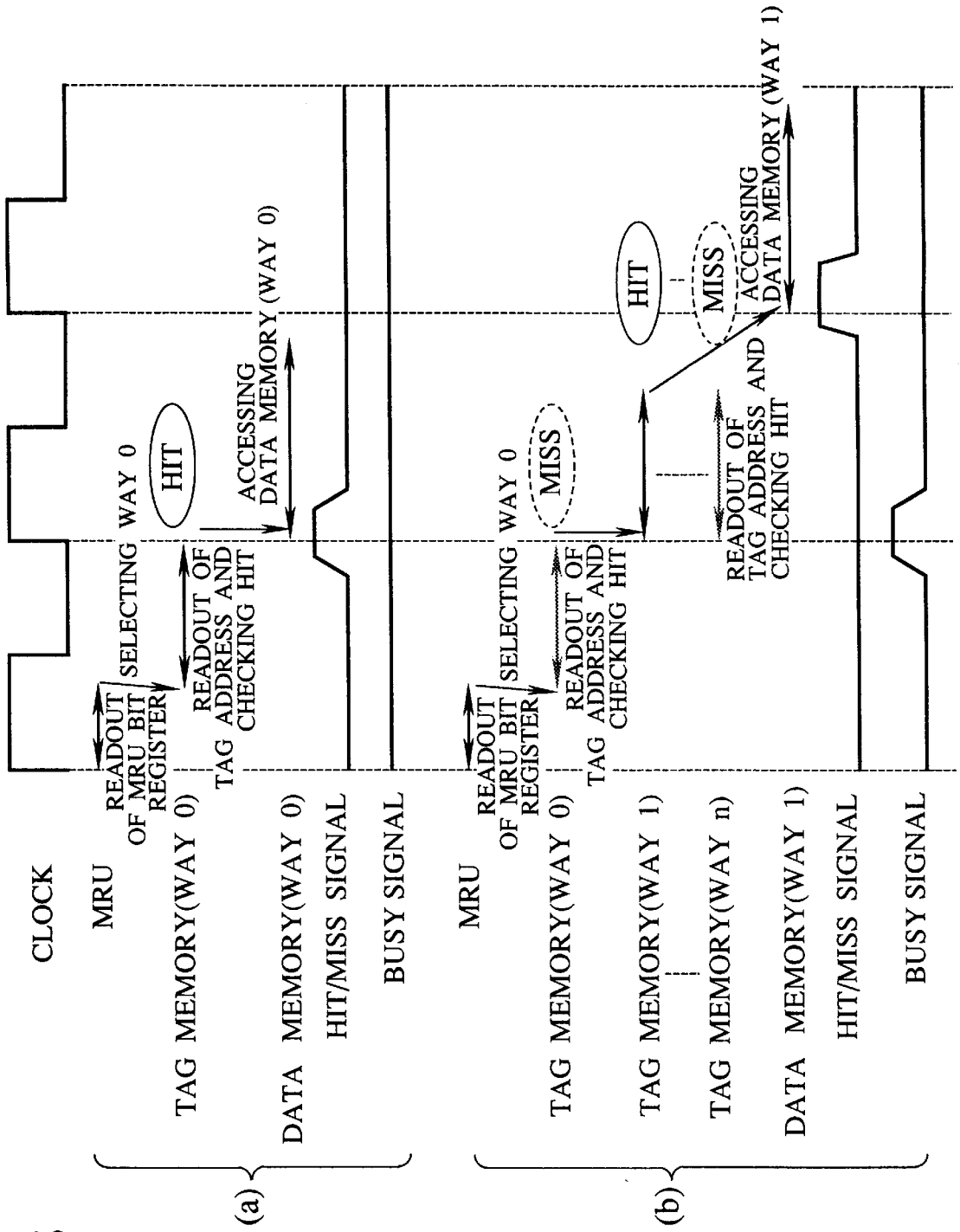
FIG. 8 is a timing chart showing the cache timing of the cache memory system based on the n-way set associative control method as the second embodiment of the present invention as shown in FIG. 7.

With reference to FIG. 7 and FIG. 8, the configuration and the operation of the cache memory system 200 of the n-way set associative control method (n is an integer and not less than 3) of the embodiment 2 according to the present invention to which the control method of the present invention is applied will now be explained.

FIG. 7 is a block diagram showing a configuration of the cache memory system 200 based on a n-way set associative control method as the second embodiment according to the present invention. FIG. 8 is a timing chart showing the cache timing of the cache memory system 200 based on the n-way set associative control method as the second embodiment of the present invention as shown in FIG. 7.

The cache memory system 200 based on the n-way set associative control method (n is not less than three, a natural number) of the embodiment 2 has an address register 41 for storing a tag address and an index address, (n+1) tag memories 43-0 to 43-n of n-ways, (n+1) data memories 45-0 to 45-n of n-ways which are incorporated corresponding to these tag memories 43-0 to 43-n respectively, a Least Recently Used (LRU) bit register 47 for storing LRU bits which show information relating to which tag memory in the tag memories 43-0 to 43-n has been Used recently, for example, a Most Recently used (MRU) bit register 57 for storing the way number of the tag memory which has been accessed or fallen in the cache hit, (n+1) tag comparators 49-0 to 49-n (hereinafter we often call them as only comparators 49-0 to 49-n) which are provided for the (n+1) tag memories 43-0 to 43-n in order to compare the tag address in the address register 41 with the tag address stored in the tag memory and for deciding whether the cache hit (these tag addresses are equal to each other) has occurred or the cache miss (these tag addresses are not equal to each other) has happened, a hit control circuit 51 for receiving the information stored in the LRU bit register 47 and information which indicates the occurrence of the cache miss or the cache hit from the tag comparators 49-0 to 49-n and for generating control signals such as a hit/miss signal, a busy signal to be transmitted to an outside device such as a Central Processing Unit (CPU, not shown) and a control signal to be transmitted to an access control circuit 55 (which will be described later) and which will be used in the data memory access operation for writing/reading it to/from the data memories 45-0 to 45-n, a way selector 53 for selecting one of data from the data memories 45-0 to 45-n based on the control signal from the hit control circuit 51 when the cache hit has occurred and for providing the selected one to outside of the cache memory system, and an access control circuit 55 for receiving the information and the control signal from the MRU bit register 57 and the hit control circuit 51 and for controlling the operation of the tag memories 43-0 to 43-n of ways 0 to n and the tag comparators 49-0 and 49-n.

In the cache memory system 200 of the embodiment 2, the first reference operation is executed only for one tag memory in the tag memories 43-0 to 43-n whose reference operation is different from that of the conventional cache memory system as shown in FIG. 5.

In order to perform this reference operation above, the cache memory system 200 of the embodiment 2 incorporates the access control circuit 55 which is connected to the MRU bit register 57, the tag memories 43-0 to 43-n and the tag comparators 49-0 and 49-n, and which controls the operation of the tag memories 43-0 to 43-n and the tag comparators 49-0 and 49-n based on the information from the MRU bit register 57. That is, the cache memory system 55 of the embodiment 2 includes the MRU bit register 57 and obtains the reference frequency information from the MRU bit register 57, not from the LRU bit register 47. The reason why the reference frequency information is obtained from the MRU bit register 57 is that the cache memory system 200 of the embodiment 2 must require the information relating to the tag memory which has been accessed recently because the number of the ways of the tag memories is not less than three and the information stored in the LRU bit register 47 is used only for selecting the tag memory which will be overwritten soon. Therefore the information stored in the LRU bit register 47 can not be used to select the tag memory which has a high probability for entering the cache hit in the following reference operation because in general, the tag memory which has been accessed recently will be referred again soon.

On the other hand, when the cache hit has occurred, the way number of the tag memory relating to the cache hit is stored into the MRU bit register 57. This information in the MRU bit register 57 is overwritten when a new cache hit has occurred. Accordingly, the access control circuit 55 receives the information relating to the way number of the tag memory which has been recently accessed or fallen into the cache hit from the MRU bit register 55 and access only the tag memory and the tag comparator corresponding to this tag memory based on the information from the MRU bit register 57.

As shown in the upper side (see (a)) of FIG. 8, when the way 0 of the tag memory 43-0 has been accessed recently or fallen into the cache hit, the first reference operation performed only for the way 0 of the tag memory 43-0 based on the control of the access control circuit 55. If the cache hit has occurred in the tag memory 43-0 of the way 0 in the first reference operation, the data stored in the data memory 45-0 corresponding to the tag memory 43-0 is selected and then transferred to an external side through the way selector 53. In this case, as shown in (a) of FIG. 8, the power consumption of the tag memory access operation is approximately 1/(n+1) of that of the conventional cache memory system based on the conventional control method as shown in FIG. 5.

In general, although the first reference operation in the cache memory system often enters the cache hit because there is a high probability that the tag memory that has been to recently will be referred to again soon, if the cache miss occurs, the following control operation will be performed by the access control circuit 200 in the cache memory system 200 of the embodiment 2. That is, as shown in the lower side (see (b)) in FIG. 8, the access control circuit 55 receives the control signal to indicate that the cache miss has occurred from the hit control circuit 51 and the access control circuit 55 transmits the control signal to all of the tag memories 43-1 to 43-n other than the tag memory 43-0 in order to access them at the same time. Then, when the cache hit has happened in one of the tag memories 43-1 to 43-n by the comparing operation of the tag comparators 49-1 to 49-n, data stored in the data memory corresponding to the tag memory in the cache hit will be selected by the way selectors 53 and then the selected data is transmitted to outside of the cache memory system 200. This second reference operation as shown in (b) of FIG. 8 is otherwise the same as that of the conventional cache memory system shown in FIG. 5. Thus, in the cache memory system 200 of the embodiment 2, the second reference operation is performed for all of the tag memories other than the tag memory which is accessed in the first reference operation. The reason why all tag memories other than the tag memory which has been referred to in the first reference operation are executed at the same time in the second reference operation is in order to avoid the occurrence of the cache miss in the second reference operation again.

In this case, when the cache miss has happened in the first reference operation, the hit control circuit 51 transmits the information relating to the occurrence of the cache miss to a target device (for example, the Central Processing Unit (CPU), not shown) to which the data in the cache memory is transmitted. However, in the following reference operation, namely in the second reference operation, when the cache miss has also happened, the hit control circuit 51 in the cache memory system 200 transmits the information (such as the hit/miss signal shown in FIG. 7) relating to the occurrence of the cache miss to the target device. Of course, when the cache hit has happened, the hit control circuit 51 in the cache memory system immediately transmits the information relating to the occurrence of the cache hit.

Embodiment 3

Next, the configuration and the operation of the cache memory system 300 of the embodiment 3 according to the present invention will now be explained.

The cache memory system 300 of the embodiment 3 is another preferred embodiment of the present invention. Like the cache memory system 100 of the embodiment 100 shown in FIG. 3, the cache memory system 300 of the embodiment 3 is performed based on the 2-way set associative control method.

Figure 9:
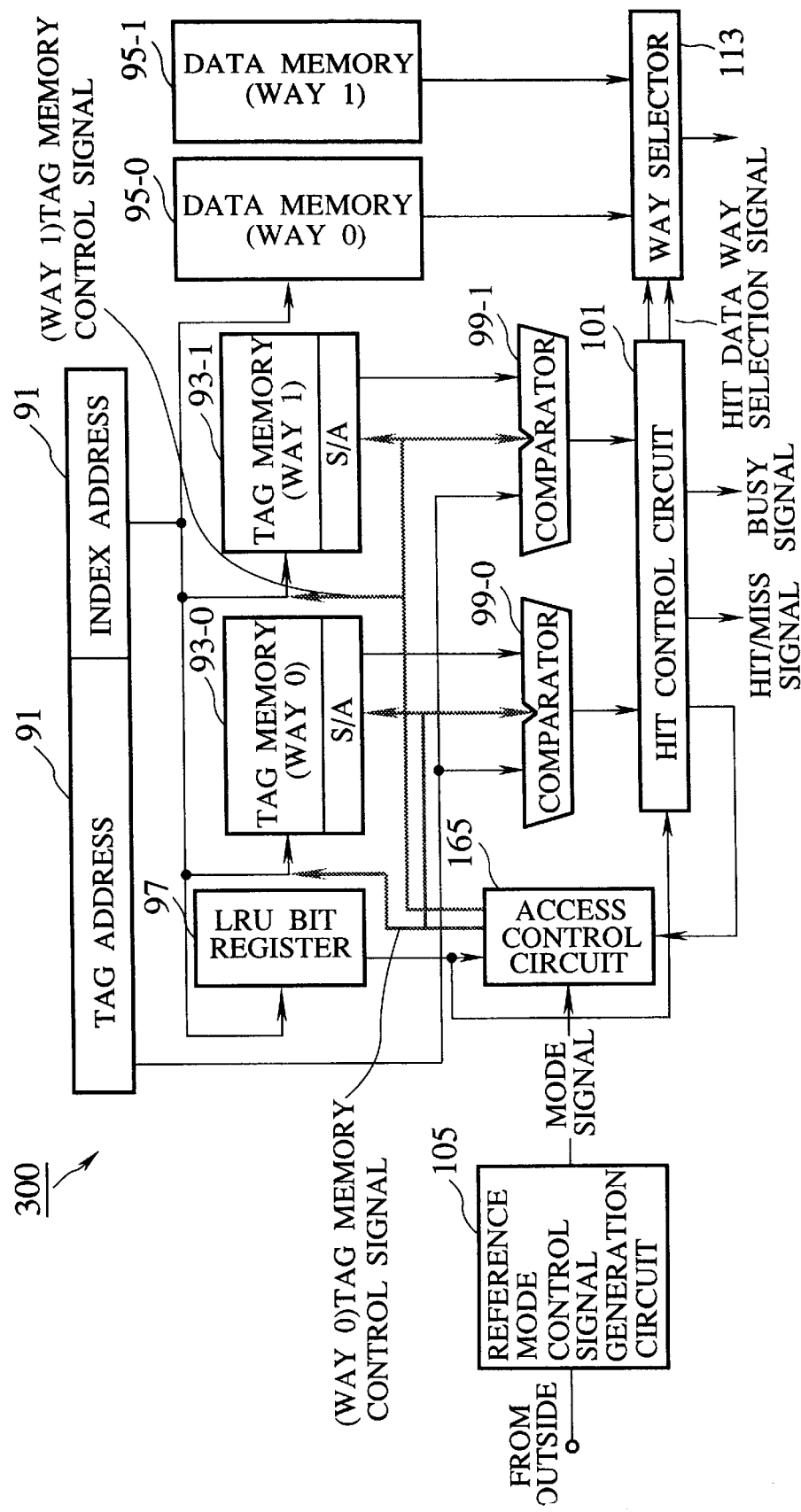
FIG. 9 is a block diagram showing a configuration of a cache memory system based on a set associative control method as the third embodiment according to the present invention.

FIG. 9 is a block diagram showing a configuration of a cache memory system based on a set associative control method as the third embodiment according to the present invention.

As comparing the configuration shown in FIG. 9 with the configuration shown in FIG. 3, the configuration of the cache memory system 300 is almost equal to that of the cache memory system 100 based on the set associative control method of the embodiment 1 according to the present invention. The difference between them is that the cache memory system 300 of the embodiment 3 has a reference mode control signal generation circuit 105.

Specifically, the cache memory system 300 of the embodiment 3 based on the 2-way set associative control method has an address register 91 for storing a tag address and an index address, two tag memories 93-0 and 93-1, two data memories 95-0 and 95-1 which are incorporated corresponding to these tag memories 93-0 and 93-1 respectively, a Least Recently Used (LRU) bit register 97 for storing LRU bits which show the information relating to which way number in the tag memories 93-0 and 93-1 has been used recently, for example, tag comparators 99-0 and 99-1 (hereinafter we often call it as only comparators 99-0 and 99-1) which are provided for tag memories 93-0 and 93-1 in order to compare the tag address in the address register 91 with the tag address stored in the tag memory and for deciding whether the cache hit (these tag addresses are equal to each other) has occurred or the cache miss (these tag addresses are not equal to each other) has happened, a hit control circuit 101 for receiving the information stored in the LRU bit register 97 and information which indicates the occurrence of the cache miss or the cache hit from the comparators 99-0 and 99-1 and for generating a control signal which will be used in a data memory access operation for overwriting/reading it to/from the data memories 95-0 and 95-1, a way selector 113 for selecting one of data from the data memories 95-0 and 95-1 based on the control signal from the hit control circuit 101 and for providing the selected one to outside of the cache memory system, and an access control circuit 165 for controlling the operations of the tag memories 93-0 and 93-1, the tag comparators 99-0 and 99-1, and the reference mode control signal generation circuit 105 for generating a reference mode control signal which indicates two reference operation modes, one mode shows the reference operation in which one of the tag memories is accessed and the other mode indicates that all of the tag memories are accessed.

The reference mode control signal designated by reference characters "MODE" indicates two modes, one is the reference mode used in the cache memory system 100 of the embodiment 1 of the present invention and the other is the conventional reference mode which has been explained in the conventional cache memory system shown in FIGS. 1 and 2. For example, a user of the cache memory system 300 of the embodiment 3 can select either reference operation mode. When the user provides a high level control signal for indicating the low consumption reference mode used in the cache memory system 100 of the embodiment 1 to a pin (not shown) in a package incorporated in a semiconductor chips including the cache memory system 300 of the embodiment 3, the high level control signal is transmitted to the reference mode control signal generation signal 105. Then the reference mode control signal generation circuit 105 generates the reference mode control signal "MODE". The control signal "MODE" is transmitted to the access control signal 165 in order to perform the low power consumption reference operation in the cache memory system 300 of the embodiment 3. On the other hand, when the user provides a low level control signal for performing the conventional reference operation to the pin (not shown), the low level control signal is transmitted to the reference mode control signal generation circuit 105. Then, the reference mode control signal generation circuit 105 generates the control signal "MODE". This control signal "MODE" is transmitted to the access control circuit 105 in order to perform the conventional reference operation in the cache memory system 300.

That is, when the low power reference operation mode is selected, the cache memory system 300 performs the low power reference operation, and when the conventional reference operation mode is selected, although the power consumption will be increased because the reference operation will be performed for all of the tag memories at the same time, the high speed reference operation can be executed. A user can select two reference operation modes based on operating conditions.

In the cache memory system 300 of the embodiment 3, the reference operation for tag addresses is controlled under the configuration in which the reference mode control signal generation circuit 105 shown in the embodiment 3 is incorporated in the cache memory system 100 based on the 2-way set associative control method of the embodiment 1, however, the present invention is not limited by this. For example, the reference operation for tag addresses can be controlled under a configuration in which the reference mode control signal generation circuit 105 shown in the embodiment 3 is incorporated in the cache memory system 100 based on the n-way set associative control method of the embodiment 2. This application can be made by a person having ordinarily skill in this art to which the present invention pertains based on the embodiments 1 to 3 described above, therefore, explanation is omitted here and this application is included in the scope of the present invention.

Although the present invention has been described and illustrated in detail, it is clearly understood that the same is by way of illustration and example only and is not to be taken by way of limitation, the spirit and scope of the present invention being limited only by the term of the appended claims.

What is claimed is:

1. A cache memory system comprising:

an address register for storing a tag address and an index address of data to be accessed;

data memories of n-ways ("n" is an integer which is not less than two) for storing data corresponding to said index address;

tag memories of n-ways corresponding to said data memories for storing tag addresses relating to said data stored in said data memories;

n-tag comparators corresponding to said tag memories of n-ways, for comparing a tag address stored in said tag memories of n-ways with said tag address stored in said address register, and for determining whether a cache hit has occurred, where these tag addresses are the same, or a cache miss has occurred, where these tag addresses are different;

a reference frequency information register for storing information indicating the way of said tag memory which has resulted in said cache hit;

an access control circuit for selecting one of said tag memories of n-ways and one of said comparators corresponding to said selected tag memory based on said information from said reference frequency information register, for operating only said selected tag memory and the selected tag comparator, and for controlling a comparison operation between said tag address stored in said address register and a tag address in said selected tag memory, executed by said selected tag comparator, and when said comparison operation between said tag address stored in said address register and said tag address in said selected tag memory results in a cache miss, said tag memories and said tag comparators except for said selected tag memory and said selected tag comparator are operated thereafter;

wherein n is two in said n-way tag memories and said n-way data memories, and said reference frequency information resister is a Last Recently Used bit register for storing information relating to the way of said tag memory corresponding to said data memory to which data will be overwritten in a following data update operation; and further comprising a reference mode control signal generation means for generating a reference mode control signal to control operation of said access control circuit, and wherein said access control circuit receives said reference mode control signal and said access control circuit switches between a first reference operation mode where one of said tag memories and one of said tag comparators are executed based on said information from said Last Recently Used bit register and a second reference operation mode where all of said tag memories and all of said tag comparators are executed at the same time.

2. A cache memory system as claimed in claim 1, wherein when said access control circuit receives information to indicate an occurrence of a cache miss in a first reference operation from said tag comparator used in said first reference operation, said access control circuit generates a control signal and transmits said control signal to all of said tag memories and all of said tag comparators other than said tag memory and said tag comparator which resulted in said cache miss in said first reference operation, and said all of said tag memories and said all of said tag comparators other than said tag memory and said tag comparator used in the first reference operation are operated at the same time in a following reference operation.

3. A cache memory system as claimed in claim 1, further comprising a hit control circuit for receiving information relating to the occurrence of a cache miss from said tag comparator relating to the tag memory selected by said access control circuit, for generating a control signal indicating selection of another tag memory and another tag comparator which have not been selected by said access control circuit, and for transmitting the control signal to said access control circuit, wherein said access control circuit receives the control signal transmitted from said hit control circuit and transmits to said another tag memory and said another tag comparator an instruction that said another tag memory and said another tag comparator be operated at the same time.

4. A cache memory system comprising:

an address register for storing a tag address and an index address of data to be accessed;

data memories of n-ways ("n" is an integer which is not less than two) for storing data corresponding to said index address;

tag memories of n-ways corresponding to said data memories for storing tag addresses relating to said data stored in said data memories;

n-tag comparators corresponding to said tag memories of n-ways, for comparing a tag address stored in said tag memories of n-ways with said tag address stored in said address register, and for determining whether a cache hit has occurred, where these tag addresses are the same, or a cache miss has occurred, where these tag addresses are different;

a reference frequency information register for storing information indicating the way of said tag memory which has resulted in said cache hit;

an access control circuit for selecting one of said tag memories of n-ways and one of said comparators corresponding to said selected tag memory based on said information from said reference frequency information register, for operating only said selected tag memory and the selected tag comparator, and for controlling a comparison operation between said tag address stored in said address register and a tag address in said selected tag memory, executed by said selected tag comparator, and when said comparison operation between said tag address stored in said address register and said tag address in said selected tag memory results in a cache miss, said tag memories and said tag comparators except for said selected tag memory and said selected tag comparator are operated thereafter;

wherein n is not less than three in said n-way tag memories and said n-way data memories, and said reference frequency information register is a Most Recently Used (MRU) bit register for storing information relating to the way of said tag memory corresponding to said data memory which was referred to recently in a reference operation for said tag address; and further comprising a reference mode control signal generation means for generating a reference mode control signal to control operation of said access control circuit, and wherein said access control circuit receives said reference mode control signal and said access control circuit switches between a first reference operation mode where one of said tag memories and one of said tag comparators are executed based on said information from said MRU bit register and a second reference operation mode where all of said tag memories and all of said tag comparators are executed at the same time.

5. A cache memory system as claimed in claim 1, further comprising a hit control circuit for receiving information relating to the occurrence of a cache miss operation from said tag comparator selected by said access control circuit, for generating a control signal indicating selection of other tag memories and other tag comparators which have not been selected by said access control circuit, and for transmitting the control signal to said access control circuit, wherein said access control circuit receives the control signal transmitted from said hit control circuit and transmits to said other tag memories and said other tag comparators an instruction that said other tag memories and said other tag comparators be operated at the same time.

* * * * *